United States Patent
Shimizu et al.

(10) Patent No.: US 6,959,781 B2
(45) Date of Patent: Nov. 1, 2005

(54) ROTATIONAL TORQUE DETECTION MECHANISM AND POWER STEERING APPARATUS

(75) Inventors: Yasuo Shimizu, Wako (JP); Yoshito Nakamura, Wako (JP); Shunichiro Sueyoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/757,328

(22) Filed: Jan. 13, 2004

(65) Prior Publication Data

US 2004/0149511 A1 Aug. 5, 2004

(30) Foreign Application Priority Data

| Feb. 4, 2003 | (JP) | ........................................ | 2003-026574 |
| Feb. 12, 2003 | (JP) | ........................................ | 2003-033739 |

(51) Int. Cl.⁷ .............................................. G01L 3/02
(52) U.S. Cl. ................... 180/444; 73/862.335
(58) Field of Search ..................... 73/862.193, 862.333, 73/862.335, 862.321, DIG. 2; 180/443, 444, 446

(56) References Cited

U.S. PATENT DOCUMENTS

| 4,887,461 | A | * | 12/1989 | Sugimoto et al. .......... 73/118.1 |
| 5,137,128 | A | * | 8/1992 | Takei et al. ................. 192/21.5 |
| 5,442,966 | A | * | 8/1995 | Hase et al. ............ 73/862.335 |
| 5,741,982 | A | | 4/1998 | Kobayashi et al. |
| 5,788,009 | A | | 8/1998 | Fee |
| 6,422,095 | B1 | | 7/2002 | Shimizu et al. |
| 6,484,592 | B2 | * | 11/2002 | Sezaki ................... 73/862.335 |
| 6,810,336 | B2 | * | 10/2004 | Nakane et al. ................. 702/43 |
| 2002/0117348 | A1 | | 8/2002 | Shimizu et al. |

FOREIGN PATENT DOCUMENTS

| JP | 2002-228527 | 8/2002 |
| JP | 2002-257648 | 9/2002 |

* cited by examiner

Primary Examiner—Avraham Lerner
(74) Attorney, Agent, or Firm—Hamre, Schuman, Mueller & Larson, P.C.

(57) ABSTRACT

A rotational torque detection mechanism is provided, which includes a rotational shaft whose first end portion reaches outside the mechanism, a magnetostrictive membrane which is disposed on a surface of the rotational shaft and varies its magnetic permeability according to an amount and direction of rotational torque acting on the rotational shaft, an excitation circuit which is disposed to confront the rotational shaft so as to excite the magnetostrictive membrane and a detection circuit which is disposed to confront the rotational shaft so as to electrically detect a change of the magnetic permeability of the magnetostrictive membrane. In the rotational detection mechanism, the first end portion is adapted to be a free end and a second end portion of the rotational shaft is rotatably supported.

7 Claims, 17 Drawing Sheets

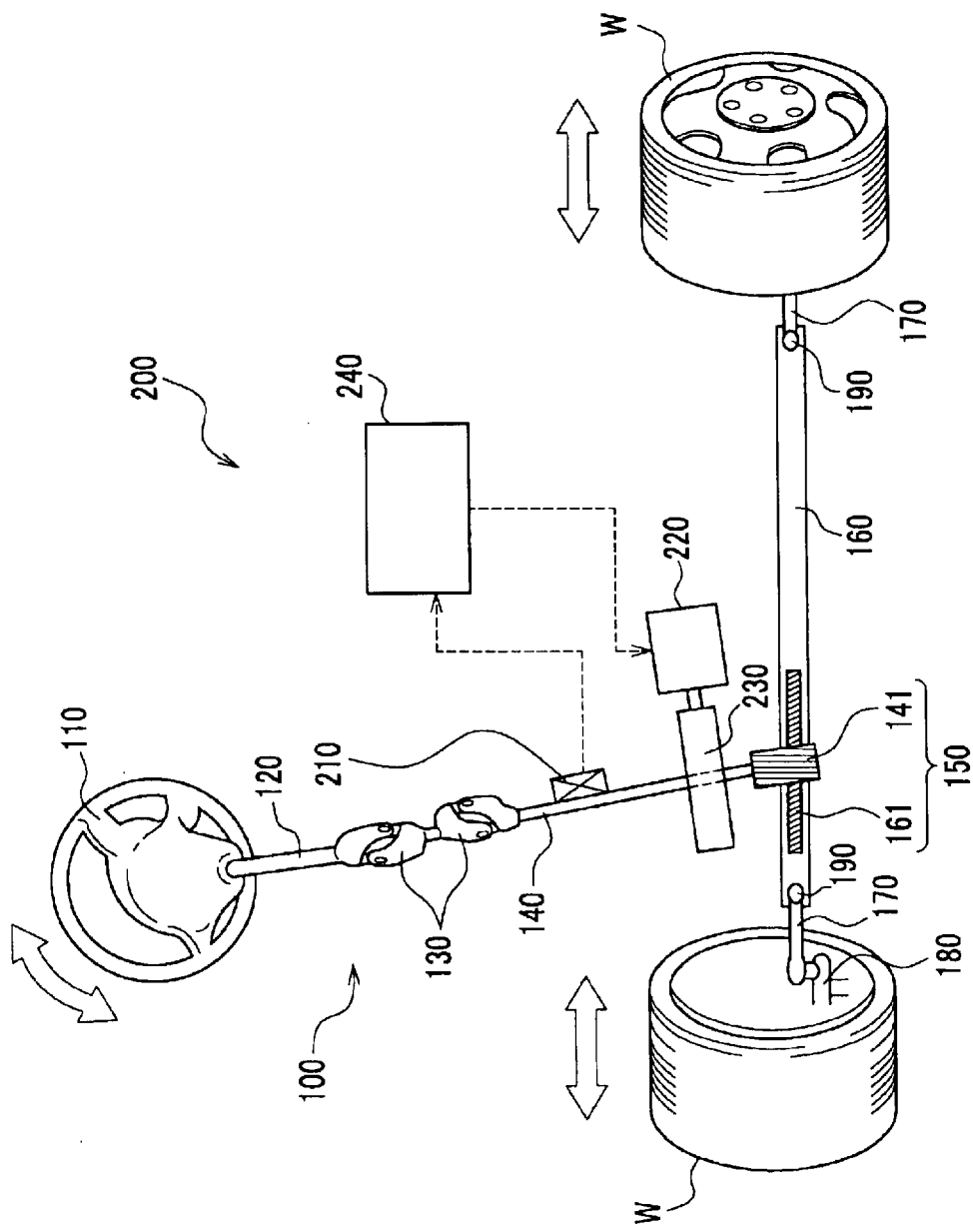

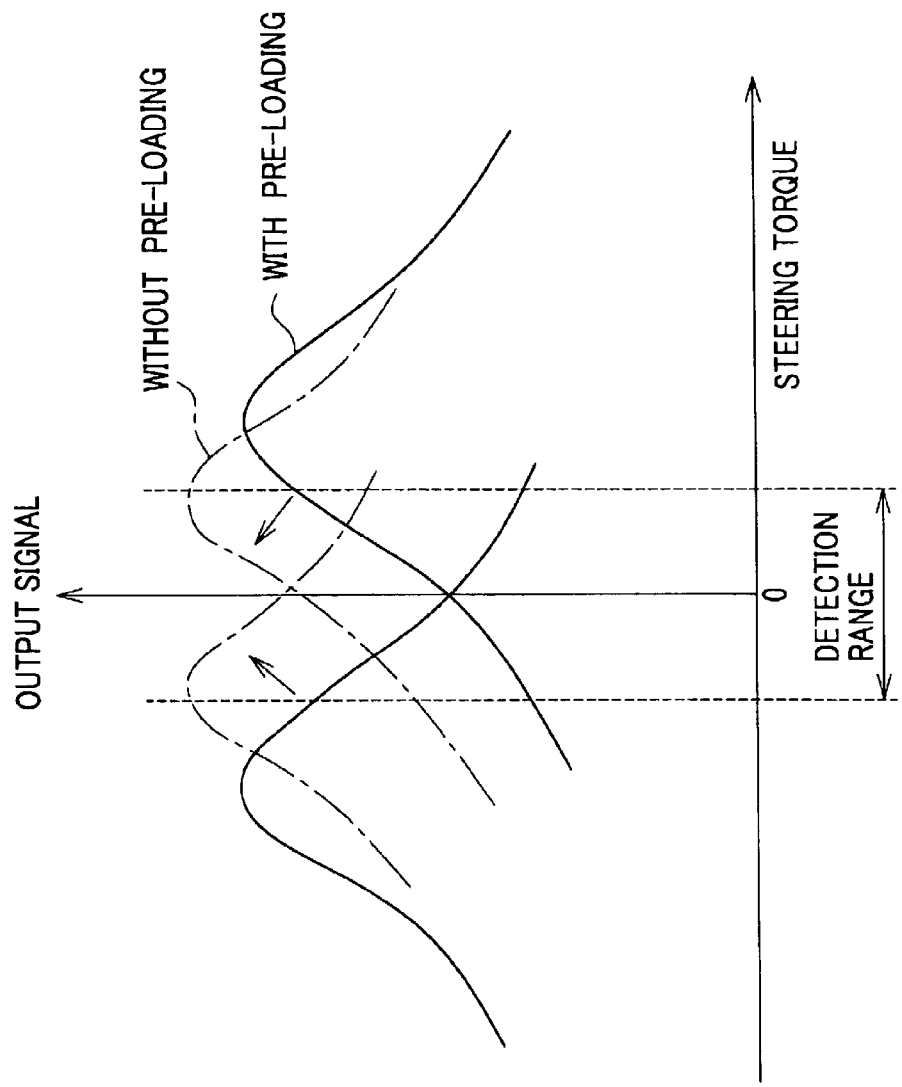

ROTATIONAL TORQUE DETECTION MECHANISM AND POWER STEERING APPARATUS

BACKGROUND OF THE INVENTION

The present invention relates to a rotational torque detection mechanism, which detects an amount and direction of rotational torque acting on a rotatably supported shaft and an electric power steering apparatus having the rotational torque detection mechanism.

An electric power steering apparatus has prevailed, which relieves the steering force required of a driver so as to provide him with comfortable steering feeling when he handles a steering wheel. In the apparatus, when the driver turns the steering wheel, a rotational torque detection mechanism detects the amount and direction of torque acting on a steering system of vehicle. Accordingly, an electric motor is controlled to generate assist torque to be applied to the steering system based on the output signal of the mechanism.

FIG. 1 is a cross sectional view showing a conventional rotational torque detection mechanism 300 disposed in an electric power steering apparatus. As shown in FIG. 1, the rotational torque detection mechanism 300 is a magnetostrictive torque sensor, which includes a rotational shaft 310 being rotatably supported, magnetostrictive membranes 320A and 320B disposed on the surface of the rotational shaft 310, excitation circuits 330A and 330B and detection circuits 340A and 340B. The magnetostrictive membranes 320A and 320B, which include plated alloy of Ni—Fe, vary their magneto permeability according to the amount and direction of rotational torque acting on the rotational shaft 310. The excitation circuits 330A and 330B impose alternating current on the magnetostrictive membranes 320A and 320B. The detection circuits 340A and 340B, which confront the excitation circuits 330A and 330B, respectively, electrically detect changes of magnetic permeability of the magnetostrictive membranes 320A and 320B. In this way, the detection circuits 340A and 340B detect the amount and direction of the rotational torque acting on the rotational shaft 310. A combination of the excitation circuit 330A and the detection circuit 340A as well as the other one of 330B and 340B are shown as united pairs, respectively, in FIG. 1.

In FIG. 1, numeral 410 represents a rack shaft, which is coupled to front right and left steerable wheels (not shown) via a tie rod (not shown) and a knuckle (not shown). Numeral 420 represents a motor for generating assist torque, numeral 430 a reduction gear mechanism which transmits the increased assist torque produced by the motor 420 to the rotational shaft 310 and numeral 440 a housing which accommodates elements of the rotational torque detection mechanism 300 and the rack shaft 410.

An upper end portion 310a of the rotational shaft 310 is mechanically coupled to a steering wheel (not shown) via a steering shaft (not shown) and a universal joint (not shown). A pinion gear 311 is formed around a lower end portion 310b, which engages with a toothed rack 411, thereby forming a rack and pinion mechanism 450. The upper and lower end portions 310a and 310b and a middle portion 310c are rotatably supported by bearings 350, 370 and 360, respectively. The excitation circuits 330A and 330B and the detection circuits 340A and 340B are disposed between the bearings 350 and 360 which support the upper end portion 310a and the middle portion 310c, respectively. The reduction gear mechanism 430 is disposed between the pair of excitation and detection circuits 330B and 340B and the bearing 360.

As an example of related art associated with this type of technique, there is Japanese Published Patent Application 2002-257648 titled "Torque Detecting Device and Electric Power Steering Device Using the Same". Also Japanese Published Patent Application 2002-228527 discloses a rotational torque detection mechanism without a magnetostrictive membrane.

Applicants have discovered that the rotational shaft 310 experiences bending between the bearings 350 and 360 as well as between the bearings 360 and 370 as a result of applied bending moment when force F100 and F200 is exerted on the rotational shaft 310, as shown in FIGS. 2A and 2B. The bending moment occurs because the upper end, middle and lower end portions 310a, 310c and 310b are supported by the bearings 350, 360 and 370, respectively. Because the conventional rotational torque detection mechanism 300 unavoidably incorporates this bending moment into its detection, it is not able to provide accurate detection for the amount or direction of rotational torque actually acting on the rotational shaft 310. In this connection, the rack shaft 410 exerts the force F100 perpendicularly on the rotational shaft 310 relative to its axial direction. On the other hand, the reduction gear mechanism 430 exerts the force F200 on the rotational shaft 310 in the same manner.

As shown in FIG. 2B, the detection circuits 340A and 340B, which are disposed separately in an axial direction of the rotational shaft 310, deliver mutually different output signals. This results from the fact that the bending moment acting on the rotational shaft 310 varies according to the axial position between the upper end portion 310a and the middle portion 310c. The applicants have found that the conventional rotational torque detection mechanism 300 is not able to provide accurate detection for the amount and direction of the rotational torque acting on the rotational shaft 310.

Variation in thickness of the magnetostrictive membranes 320A and 320B depending on the circumferential position of the rotational shaft 310 makes the detection circuits 340A and 340B generate output signals dependent on the circumferential detection points. This also results in less accurate detection for the rotational torque.

When a steering wheel is rotated right or left until it reaches an end-of-stop, either the right or left end of the rack shaft 410 hits the end of a lower housing, which accommodates the rack shaft 410. This hitting results in generation of impulsively large torque transmitted to the rotational shaft 310, thereby causing plastic deformation for the rotational shaft 310. It may lead to separation of the magnetostrictive membranes 320A and 320B from the rotational shaft 310.

The plastic deformation of the rotational shaft 310 or the separation of the magnetostrictive membranes 320A and 320B described above creates hysteresis, thereby resulting in deterioration of accuracy for the rotational torque detection mechanism 300.

In addition, undesirable nonlinear component within a range of steering torque detection, which is attributed to the plastic deformation of the rotational shaft 310, also deteriorates the accuracy achieved by the rotational torque detection mechanism 300.

SUMMARY OF THE INVENTION

The present invention provides a rotational torque detection mechanism introducing a magnetostrictive membrane, which is able to accurately detect an amount and direction of rotational torque acting on a rotational shaft, and an electric power steering apparatus which incorporates the rotational torque detection mechanism as a torque sensor.

According to an aspect of the present invention, a rotational torque detection mechanism is provided, which includes a rotational shaft that is rotatably supported and has a first end portion reaching outside the mechanism, a magnetostrictive membrane that is disposed on a surface of the rotational shaft and varies its magnetic permeability according to an amount and direction of rotational torque acting on the rotational shaft, an excitation circuit that is disposed to confront the rotational shaft so as to excite the magnetostrictive membrane and a detection circuit that is disposed to confront the rotational shaft so as to electrically detect a change of the magnetic permeability of the magnetostrictive membrane. In the rotational detection mechanism of the present invention, the first end portion is adapted to be a free end and a second end portion of the rotational shaft is rotatably supported.

The rotational torque detection mechanism described above can prevent bending moment from acting on the first end portion of the rotational shaft. The reason for this is that the bending moment does not act on the first end portion while external force acts perpendicularly on the rotational shaft relative to its axis and creates bending because the first end portion is adapted to be the free end and the second portion is supported. In this way, the rotational torque detection mechanism can accurately detect the amount and direction of the rotational torque. In this connection, a circuit generating alternating or rectangular wave voltage may be selected for the excitation circuit for the magnetostrictive membrane.

According to another aspect of the present invention, a rotational torque detection mechanism is provided, which further includes an elastic member that is slidably disposed around a first end portion.

The rotational detection mechanism described above, which has the elastic element disposed slidably around the first end portion of the rotational shaft, can damp the amplitude of resonant frequency because the elastic element contacts the first end portion even if the bending resonant frequency of the rotational shaft falls as a result of dropping of the stiffness of the rotational shaft. This allows the rotational torque detection mechanism to prevent an increase in the bending moment caused by the resonance of the rotational shaft, thereby eliminating a chance of erroneously delivering an excessive torque signal. Therefore, the mechanism can accurately detect the amount and direction of the rotational torque acting on the rotational shaft.

According to still another aspect of the present invention, a rotational torque detection mechanism is provided, which further includes a bearing which is disposed around a first end portion with a predetermined gap distance.

The rotational torque detection mechanism described above, in which the bearing is disposed around the first end portion with the predetermined gap, can support the rotational shaft with the bearing even if the rotational shaft is forced to bend excessively when large force perpendicularly acts on the rotational shaft. In this way, the mechanism can prevent the plastic deformation of the rotational shaft because the rotational shaft does not axially bend more than the predetermined gap distance.

According to yet another aspect of the present invention, a rotational torque detection mechanism is provided, in which the thickness of a magnetostrictive membrane is adapted to be less than or equal to 30 micron meters.

The rotational detection mechanism described above, in which the thickness of the magnetostrictive membrane is adapted to be less than or equal to 30 micron meters, can restrain the variation in torque detection. The reason for this is that the sufficiently thinned magnetostrictive membrane does not affect adversely the detection even if its unevenness causes variation in its magnetic permeability according to the circumferential position of the rotational shaft.

According to further aspect of the present invention, a rotational torque detection mechanism is provided, in which Rockwell hardness of a rotational shaft is adapted to fall in a range between equal to or greater than 40 and less than or equal to 65.

The rotational torque detection mechanism described above, in which Rockwell hardness of the rotational shaft is adapted to be equal to or greater than 40 to less than or equal to 65, can prevent the plastic or permanent deformation of the rotational shaft even if excessive torque, as much as 30 Kgf-m (294 N-m) for example, is applied to it. This results in protection for separation of the magnetostrictive membrane from the rotational shaft because the deformation of the rotational shaft can be maintained within an elastic range. In this way, the rotational torque detection mechanism can increase its accuracy because the magnetostrictive membrane can maintain stable attachment to the rotational shaft.

According to still further aspect of the present invention, an electric power steering apparatus is provided, which employs a rotational torque detection mechanism. The apparatus provides assist torque according to an output signal of the mechanism.

The electric power steering apparatus, which employs the rotational torque detection mechanism so as to detect the amount and direction of rotational torque or steering torque acting on the steering system, can incorporate accurate output of the mechanism when a driver handles the steering wheel of a vehicle. This brings improvement in steering feeling of the driver.

According to yet further aspect of the present invention, an electric power steering apparatus is provided, which further includes a shock absorber that relaxes impact force acting on a rotational torque detection mechanism.

The electric power steering apparatus described above can prevent the magnetostrictive membrane from separating from the rotational shaft because the shock absorber can absorb impact force which is caused by hitting between the end of a rack shaft and the end of a lower housing. In this way, the hysteresis and durability of the rotational torque detection mechanism can be improved, which provides better steering feeling for a driver.

According to another aspect of the present invention, a method for manufacturing a rotational torque detection mechanism is provided. The mechanism includes a rotational shaft, a magnetostrictive membrane disposed on a surface of the rotational shaft, an excitation circuit for exciting the magnetostrictive membrane, and a detection circuit for electrically detecting a change of magnetic permeability of the magnetostrictive membrane. The method includes the steps of applying heat treatment to the rotational shaft so that its Rockwell hardness is adapted to fall in a range between equal to or greater than 40 and less than or equal to 65, attaching the magnetostrictive membrane to the rotational shaft after the heat treatment and imposing anisotropy on the magnetostrictive membrane.

The method described above can dispense with heat treatment for the rotational shaft after anisotropy is imposed on the magnetostrictive membrane. In this way, the rotational torque detection mechanism can have high detection accuracy because the anisotropy of the magnetostrictive membrane is stabilized.

BRIEF DESCRIPTION OF THE DRAWINGS

FIG. 3 is schematic diagram showing the steering system of a vehicle and an electric power steering apparatus disposed in the steering system.

FIG. 6A is a schematic diagram showing bending in a rotational shaft and FIG. 2B is another schematic diagram showing bending moment, when force F1 and F2 is applied to the shaft.

FIG. 17 is a conceptual graph showing output signals generated by a pair of magnetostrictive membranes with and without pre-loading.

DESCRIPTION OF THE PREFERRED EMBODIMENTS

Embodiments of the present invention are now described with reference to the accompanying drawings. In this connection, a rotational torque detection mechanism is included in an electric power steering apparatus.

Figure 1:
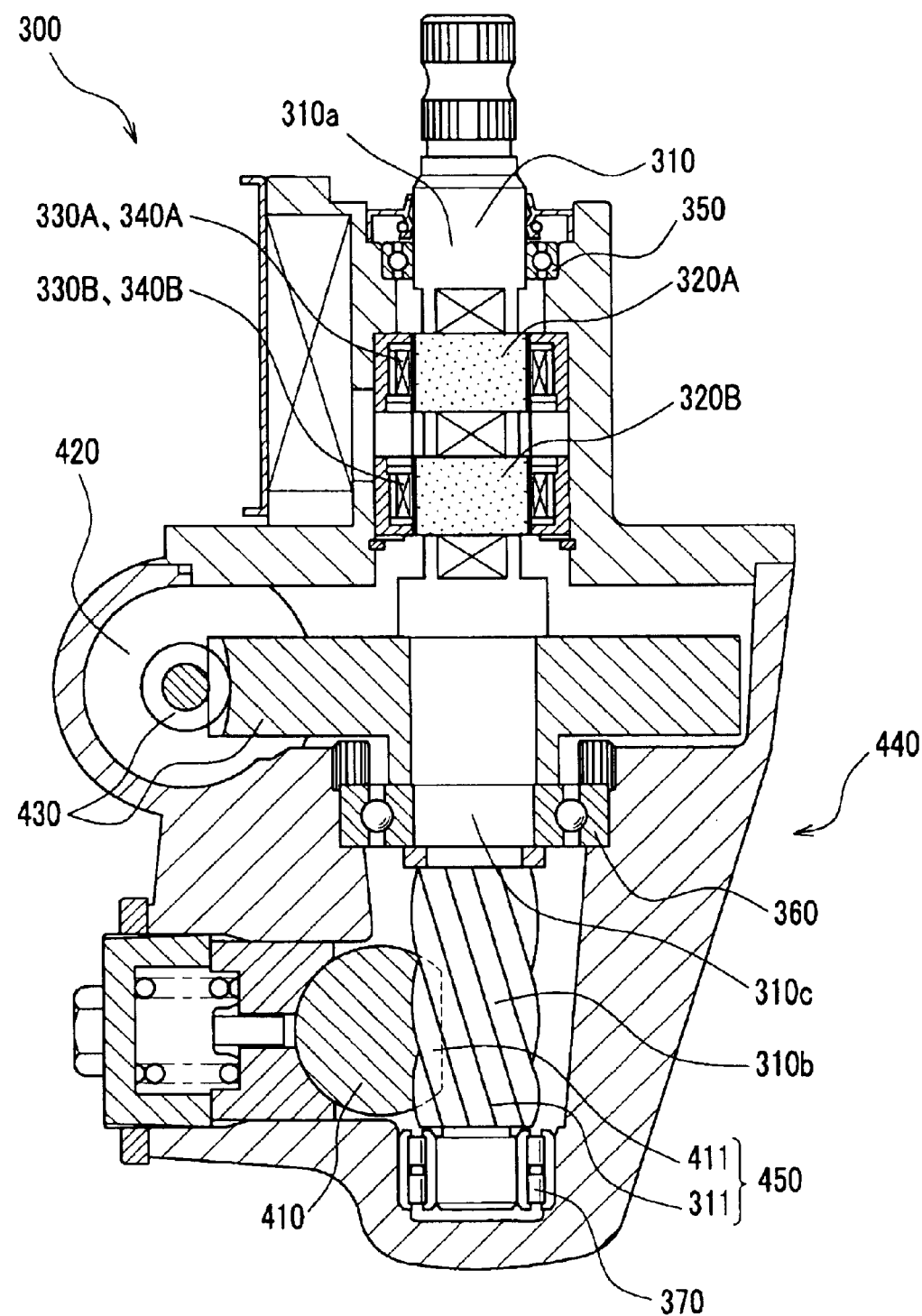
FIG. 1 is a sectional view showing a rotational torque detection mechanism in an electric power steering apparatus of the prior art.
Figures 2A, 2B:
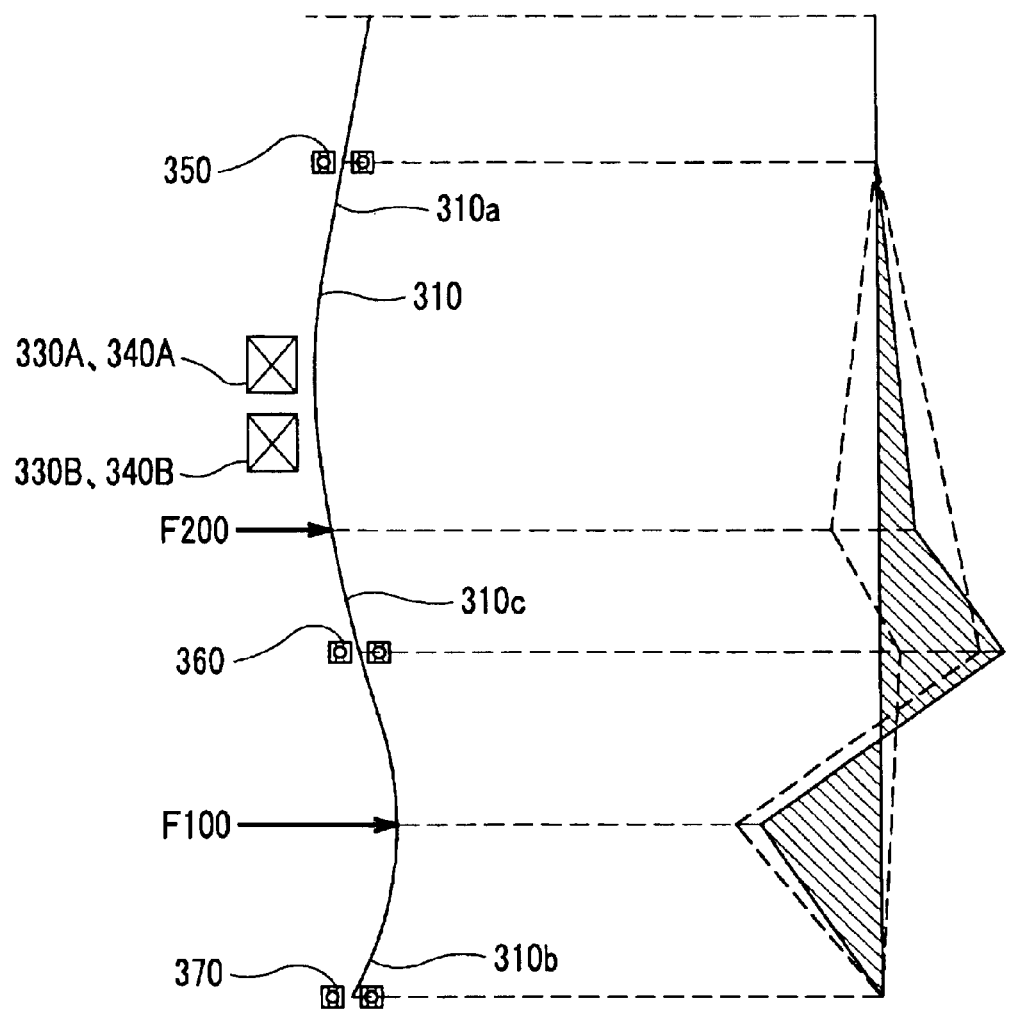
FIG. 2A is a schematic diagram showing bending in a rotational shaft and FIG. 2B is another schematic diagram showing bending moment, when force F100 and F200 is applied to the shaft.
Figure 4:
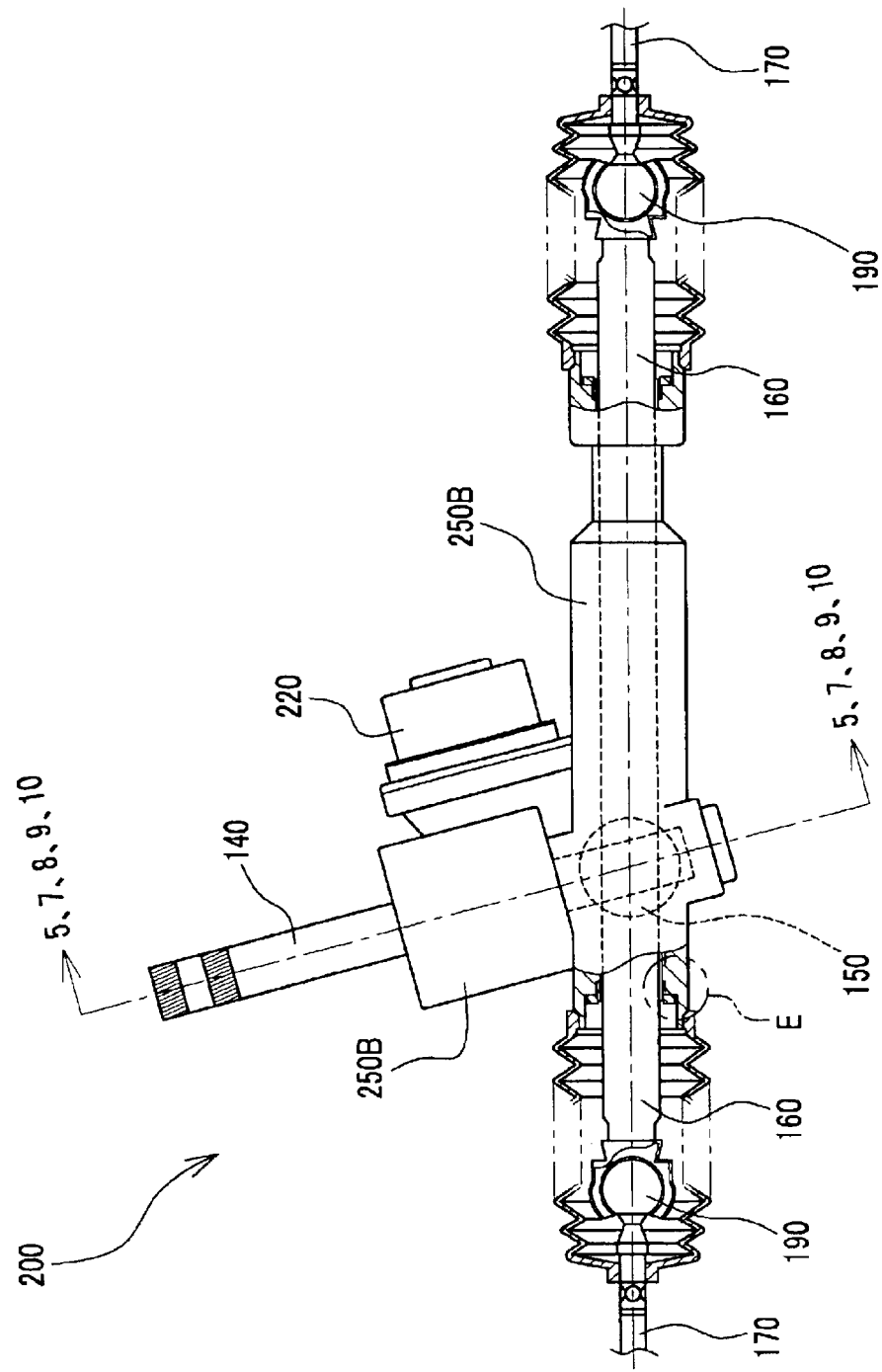
FIG. 4 is a partial sectional view showing an electrical power steering apparatus shown in FIG. 3.
Figure 5:
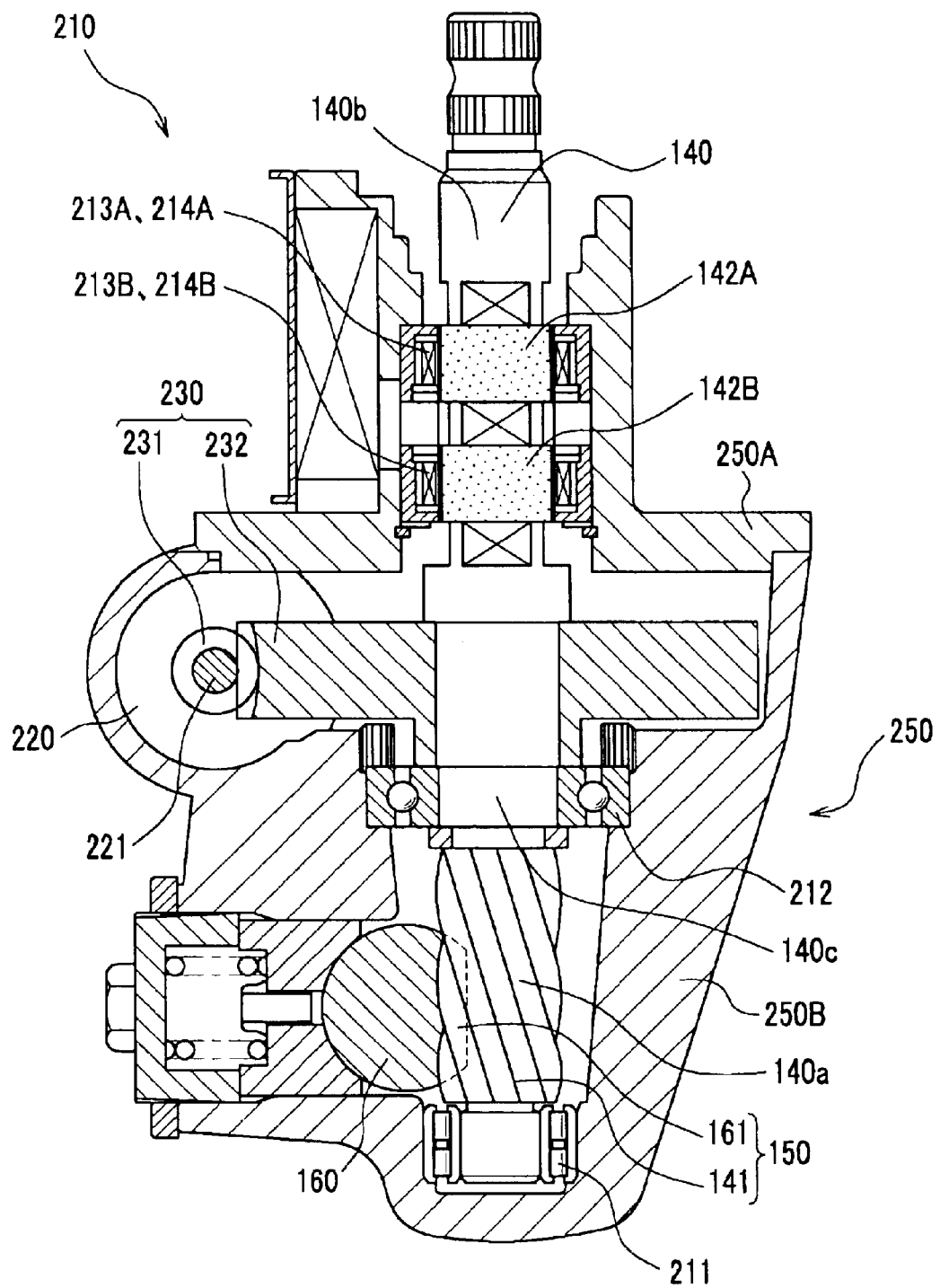
FIG. 5 is a sectional view taken along line 5—5 in FIG. 4 showing one rotational torque detection mechanism according to the present invention.

A steering system 100 of a vehicle and an electric power steering apparatus 200 included in the steering power steering system 100 are described in detail referring to FIGS. 3, 4 and 5.

As shown in FIG. 3, the steering system 100 includes a steering wheel 110, a rotational shaft 140 which is coupled to the steering wheel 110 via a steering shaft 120 and universal joints 130, and a rack shaft 160 which is coupled to the rotational shaft 140 via a rack and pinion mechanism 150. Forward right and left steerable wheels W are attached to both ends of the rack shaft 160 via a tie rod 170 and a knuckle 180.

As shown in FIG. 5, the rack and pinion mechanism 150, in which a pinion gear 141 formed around a lower end portion 140a of the rotational shaft 140 engages with a toothed rack 161 formed on the rack shaft 160, converts angular rotation of the rotational shaft 140 into linear movement of the rack shaft 160. As shown in FIGS. 3 and 4, ball joints 190 are coupled to both ends of the rack shaft 160 and the tie rods 170 are coupled to the ball joints 190. The power steering system 100 can thus steer the front right and left wheels W when a driver handles the steering wheel 110.

The electric power steering apparatus 200, which provides assist torque to the rotational shaft 140 that is coupled to the steering wheel 110 handled by a driver, relieves effort required of the driver. As shown in FIG. 3, the electric power steering apparatus 200 includes a rotational torque detection mechanism 210, a motor 220 generating assist torque, a reduction gear mechanism 230 and a controller 240. The rotational torque detection mechanism 210 detects an amount and direction of steering torque acting on the rotational shaft 140. The reduction gear mechanism 230 magnifies the torque generated by the motor 220 and transmits it to the rotational shaft 140 as assist torque. The controller 240 controls the motor 220 so as to produce assist torque according to the output signal delivered by the rotational torque detection mechanism 210.

As shown in FIG. 5, the reduction gear mechanism 230, in which a worm or drive gear 231 formed around a drive shaft 221 of the motor 220 engages with a worm wheel or driven gear 232 coupled to the rotational shaft 140, transmits the assist torque produced by the motor 220 to the rotational shaft 140 via the worm gear 231 and the worm wheel 232. In this connection, the assist torque produced by the motor 220 is magnified according to the gear ratio between the worm gear 231 and the worm wheel 232.

The controller 240, which includes a computer for example, calculates an amount and direction of rotational torque to be applied to the rotational shaft 140 according to output signals delivered by detection circuits 214A and 214B as shown in FIG. 5. The controller 240 thus controls the motor 220 so as to generate assist torque according to the calculation.

As shown in FIG. 5, the rotational shaft 140, rack and pinion mechanism 150, rotational torque detection mechanism 210 and reduction gear mechanism 230 are housed in a housing 250, which includes upper and lower housings 250A and 250B. The motor 220 is attached to the lower housing 250B. An upper end portion 140b of the rotational shaft 140 reaches the outside above the upper housing 250A and is coupled to the steering wheel 110 via the steering shaft 120 and the universal joints 130 as shown in FIG. 3.

When a driver turns the steering wheel 110, the electric power steering apparatus 200 described above detects an amount and direction of steering torque with the rotational torque detection mechanism 210 and generates assist torque according to the detection. The electric power steering apparatus 200 transmits the assist torque magnified by the reduction gear mechanism 230 to the rotational shaft 140, thereby relieving effort required of the driver.

a. First Embodiment

Figure 6:
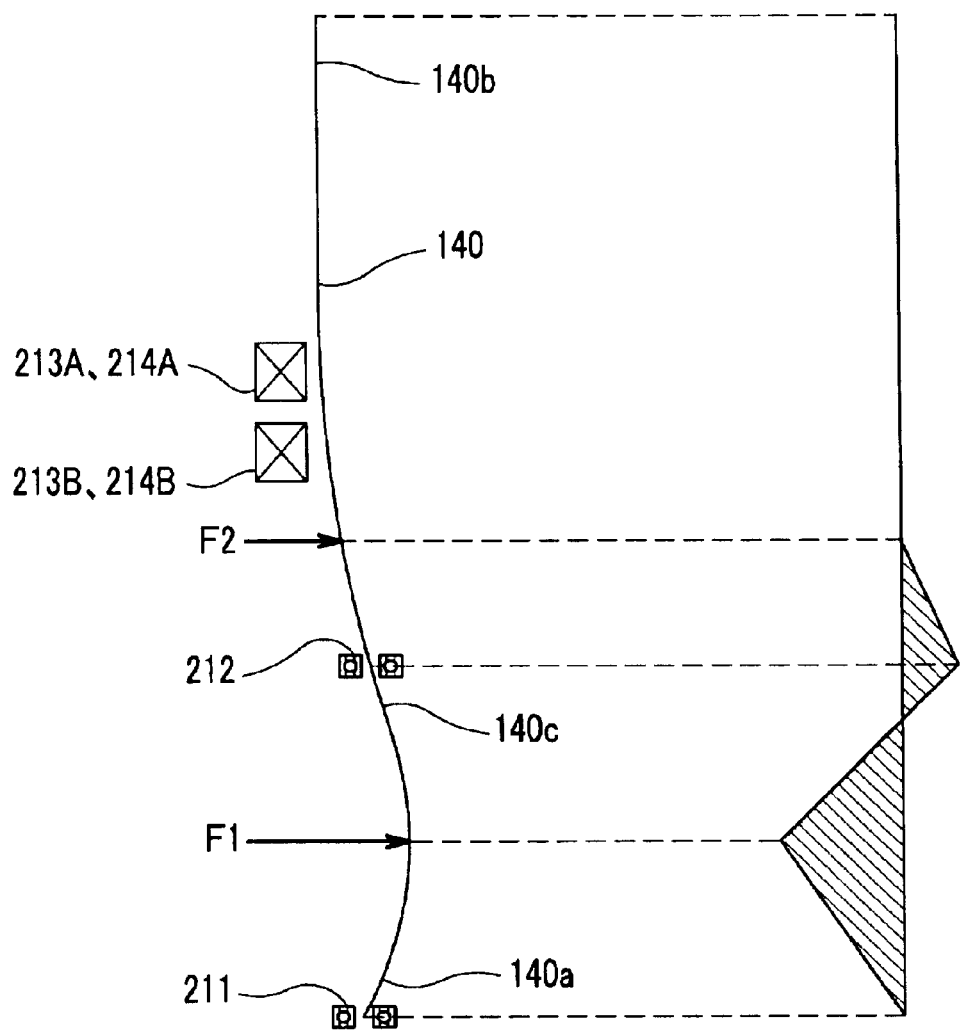

A first embodiment of the present invention is described with reference to FIGS. 5, 6A and 6B. FIG. 5 is a sectional view showing a rotational torque detection mechanism taken along line 5—5 in FIG. 4. FIG. 6A is a schematic diagram illustrating bending of a rotational shaft when force F1 and F2 is applied to it. FIG. 6B is another schematic diagram illustrating bending moment acting on the rotational shaft.

As shown in FIG. 5, a rotational torque detection mechanism 210 includes a rotational shaft 140, a first bearing 211, a second bearing 212, excitation circuits 213A and 213B and detection circuits 214A and 214B. The rotational shaft 140 as shown in FIG. 3 is coupled to a steering wheel 110 via a steering shaft 120 and universal joints 130. The first bearing 211 rotatably supports a lower end portion 140a of the rotational shaft 140 and the second bearing 212 a middle portion 140c. The excitation circuits 213A and 213B, which confront the rotational shaft 140 between an upper end portion 140b and a middle portion 140c, impose alternating voltage on magnetostrictive membranes 142A and 142B so as to excite them. The detection circuits 214A and 214B electrically detect changes of magnetic permeability of the magnetostrictive membranes 142A and 142B. In this connection, the excitation circuit 213A and the detection circuit 214A are shown as a united pair in the FIG. 5. This is also the case with the excitation circuit 213B and the detection circuit 214B. The upper end portion 140b of the rotational shaft 140 refers to "a first end portion" and the lower end portion 140a refers to "a second end portion" described in the appended claims.

The lower end portion 140a is meant to represent an end portion of the rotational shaft 140 where a pinion gear 141 engaging with a toothed rack 161 is formed. On the other hand, the upper end portion 140b is meant to represent the other end portion to which the steering wheel 110 is coupled via the steering shaft 120 and universal joints 130, as shown in FIG. 3. The upper end portion 140b is adapted to be a free end, which is not supported by a bearing unlike the lower end portion 140a and middle portion 140c. The middle portion 140c is located slightly offset downwardly from the middle between the lower end portion 140a and upper end portion 140b. A worm wheel 232 is attached to the middle portion 140c on the upper side.

The magnetostrictive membranes 142A and 142B are attached around the surface of the rotational shaft 140, which vary their magnetic permeability according to an amount and direction of rotational torque acting on the rotational shaft 140. The magnetostrictive membranes 142A and 142B, which are made of magnetostrictive material such as an Ni—Fe alloy, are plated on the surface of the rotational shaft 140 between the upper end portion 140b and middle portion 140c.

The rotational torque detection mechanism 210 described above, in which the detection circuits 214A and 214B electrically detect changes of magnetic permeability of the magnetostrictive membranes 142A and 142B, detect an amount and direction of rotational torque acting on the rotational shaft 140.

As shown in FIGS. 6A and 6B, even if bending of the rotational shaft 140 occurs, bending moment does not act on the rotational shaft 140 between the middle portion 140c and the upper end portion 140b where the excitation circuits 213A and 213B and detection circuits 214A and 214B are disposed. The reason for this is that the upper end portion 140b adapted to be a free end, which is not supported by a bearing, is free from the bending moment although the rack and pinion mechanism 150 and the reduction gear mechanism 230 exert force F1 and F2 perpendicularly on the rotational shaft 140, respectively. In this way, the rotational torque detection mechanism 210 can accurately detect the amount and direction of rotational torque acting on the rotational shaft 140.

b. Second Embodiment

Figure 7:
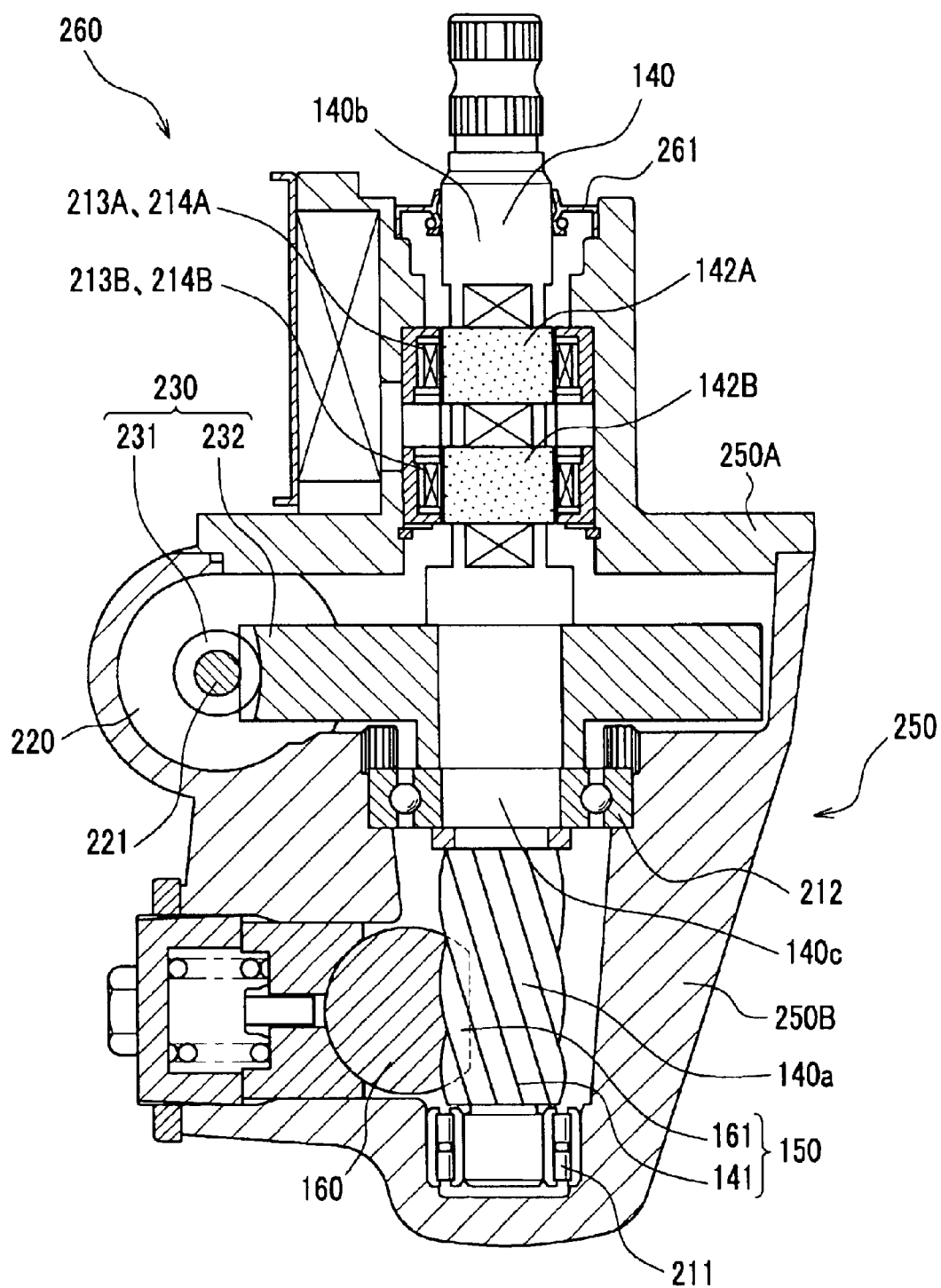
FIG. 7 is a sectional view taken along line 7—7 in FIG. 4 showing another rotational torque detection mechanism according to the present invention.

A second embodiment of the present invention is described referring to FIG. 7. FIG. 7 is a sectional view showing a rotational torque detection mechanism of the second embodiment taken along line 7—7 in FIG. 4.

As shown in FIG. 7, a rotational torque detection mechanism 260 has an oil seal 261 serving as an elastic element, which is slidably attached around an upper end portion 140b of a rotational shaft 140. This makes a difference between the rotational torque detection mechanisms 260 and 210 according to the first embodiment shown in FIG. 5. The same symbol is used for an item which is the same as that of the first embodiment and description in detail would not be repeated for it.

As shown in FIG. 7, the oil seal 261, which is slidably disposed around the upper end portion 140b, helps damp the bending resonance occurring in the rotational shaft 140 because the oils seal 261 contacts the upper end portion 140b when the bending resonant frequency of the rotational shaft 140 drops to the frequency detection range of the rotational torque detection mechanism 260 as a result of decrease in the bending stiffness. Therefore, the rotational torque detection mechanism 260 of the second embodiment can restrain the development of bending moment resulting from the bending resonance occurring in the rotational shaft 140, thereby eliminating a chance of erroneously delivering an excessive torque signal. This results in accurate measurement of amount and direction of rotational torque acting on the rotational shaft 140.

c. Third Embodiment

Figure 8:
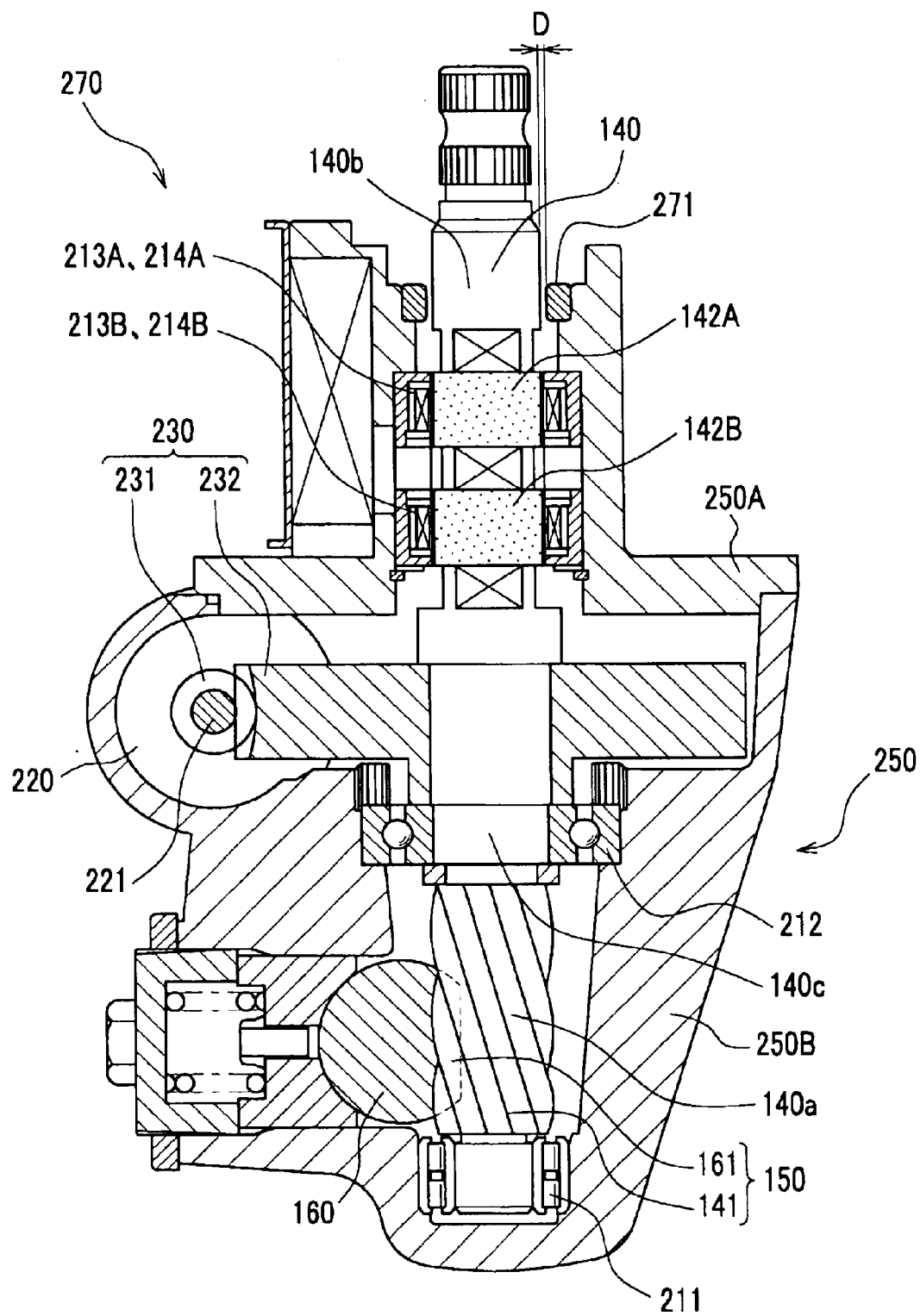
FIG. 8 is a sectional view taken along line 8—8 in FIG. 4 showing another rotational torque detection mechanism according to the present invention.

A third embodiment of the present invention is described in detail referring to FIG. 8. FIG. 8 is a sectional view showing a rotational torque detection mechanism of the third embodiment taken along line 8—8 in FIG. 4.

As shown in FIG. 8, a rotational torque detection mechanism 270 has a plain bearing 271, which keeps a predetermined gap distance D relative to an upper end portion 140b. This makes a difference between the rotational torque detection mechanisms 270 and 210 according to the first embodiment shown in FIG. 5. The same symbol is used for an item which is the same as that of the first embodiment and description in detail would not be repeated for it.

As shown in FIG. 8, the plain bearing 271, which is disposed around the upper end portion 140b with the predetermined gap distance D, can support the rotational shaft 140 so that it does not bend more than the distance D when excessive force is externally applied to it. In this way, the rotational torque detection mechanism 270 of the third embodiment can prevent plastic deformation of the rotational shaft 140.

d. Fourth Embodiment

Figure 9:
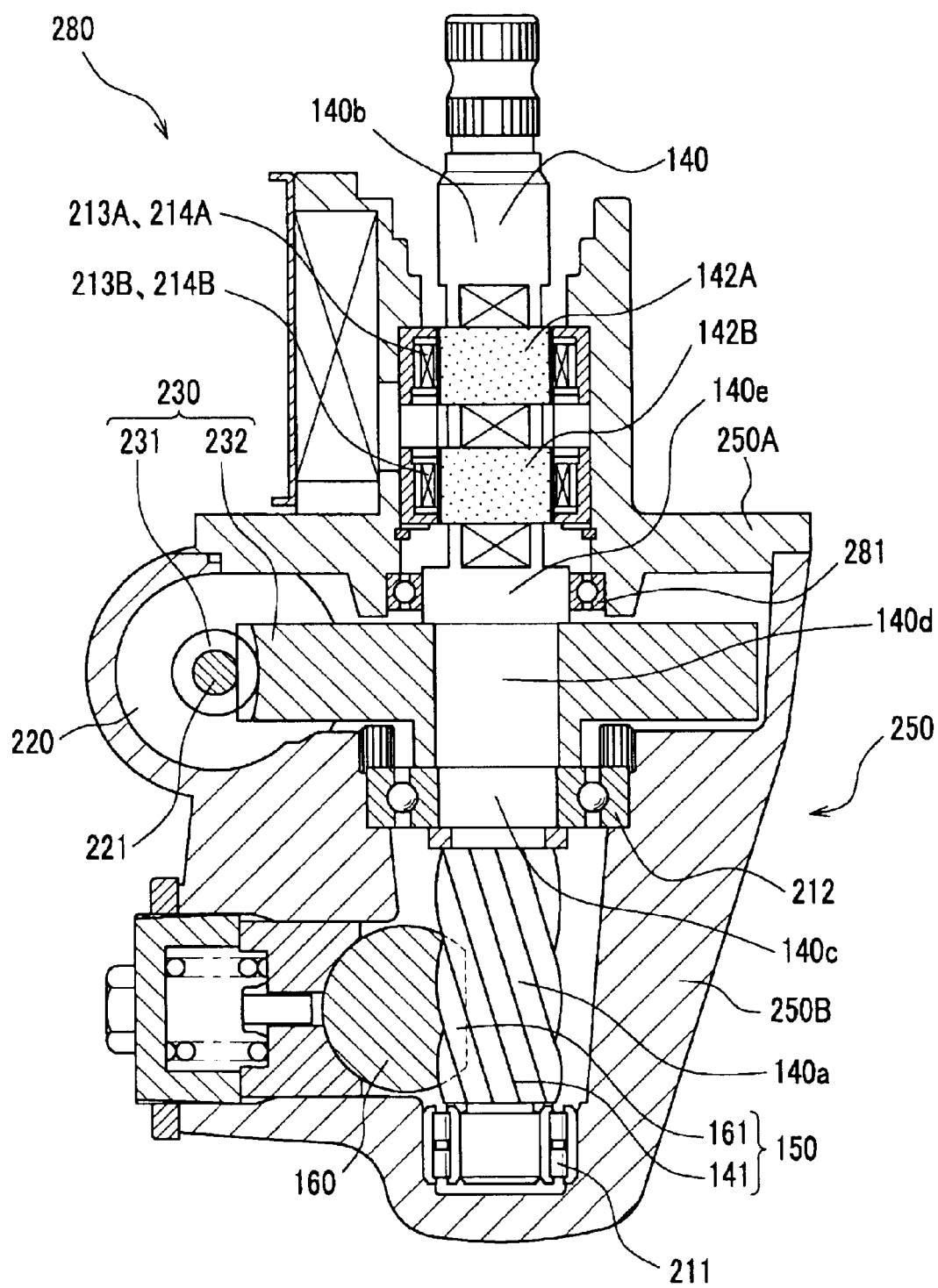
FIG. 9 is a sectional view taken along line 9—9 in FIG. 4 showing another rotational torque detection mechanism according to the present invention.

A fourth embodiment of the present invention is described in detail referring to FIG. 9. FIG. 9 is a sectional view showing a rotational torque detection mechanism of the fourth embodiment taken along line 9—9 in FIG. 4.

As shown in FIG. 9, a rotational torque detection mechanism 280 has a third bearing 281, which is disposed between an upper end portion 140b of a rotational shaft 140 and a portion 140d where a worm wheel 232 is attached. The third bearing 281 rotatably supports the rotational shaft 140. This makes a difference between the rotational torque detection mechanisms 280 and 210 according to the first embodiment shown in FIG. 5. It may be preferable to place the third bearing 281 in the vicinity of the worm wheel 232. The same symbol is used for an item which is the same as that of the first embodiment and description in detail would not be repeated for it.

Because the third bearing 281 is disposed as described above, bending moment does not act on the portion between the upper end portion 140b and an portion 140e supported by the third bearing 281 when a reduction gear mechanism 230 exerts external force on the portion 140d where the worm wheel 232 is attached. In this way, the rotational torque detection mechanism 280, which is free from adverse effect of the bending moment, can provide good accuracy for the detection of amount and direction of rotational torque.

e. Fifth Embodiment

Figure 10:
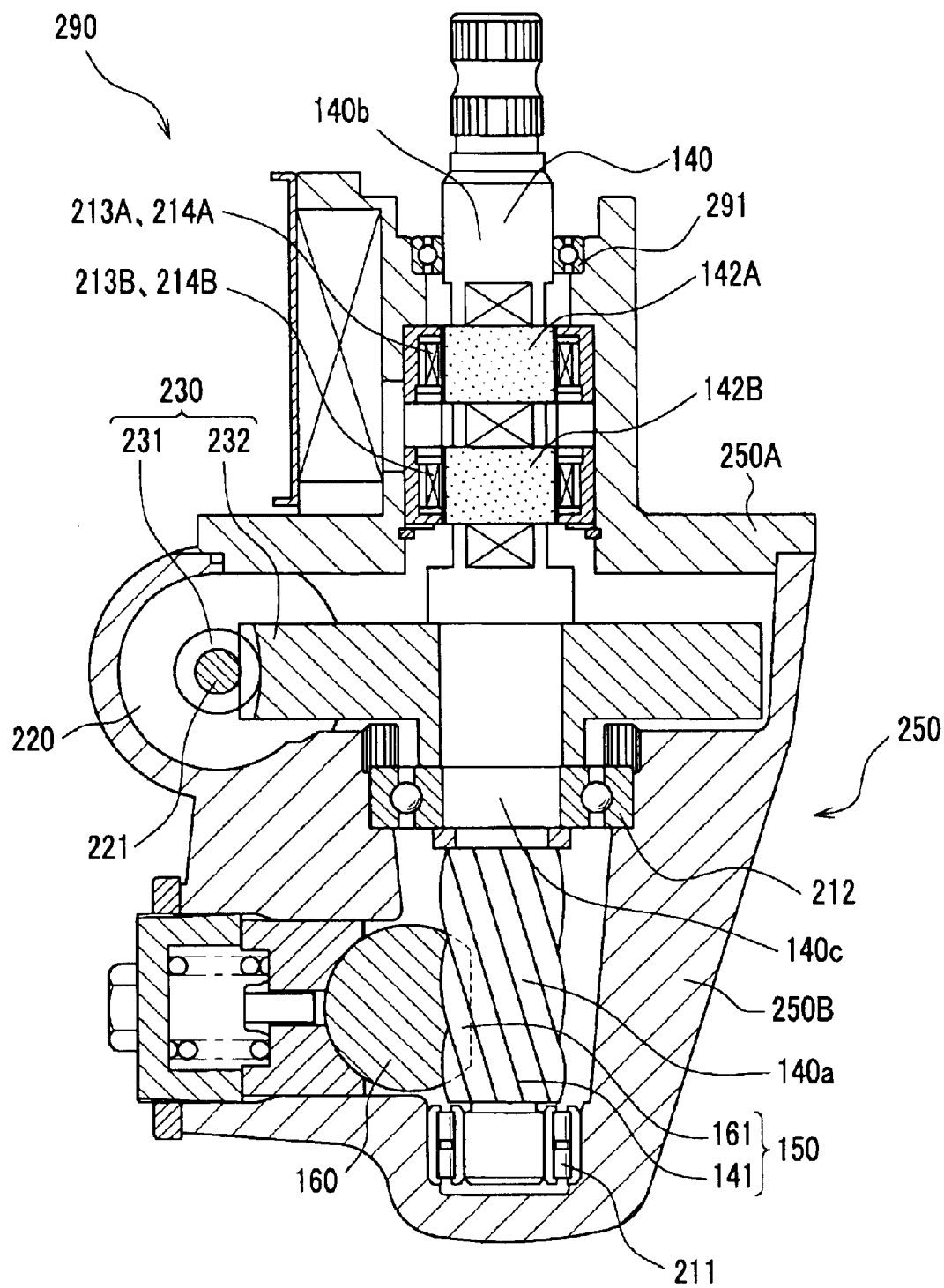
FIG. 10 is a sectional view taken along line 10—10 in FIG. 4 showing the other rotational torque detection mechanism according to the present invention.
Figure 11A:
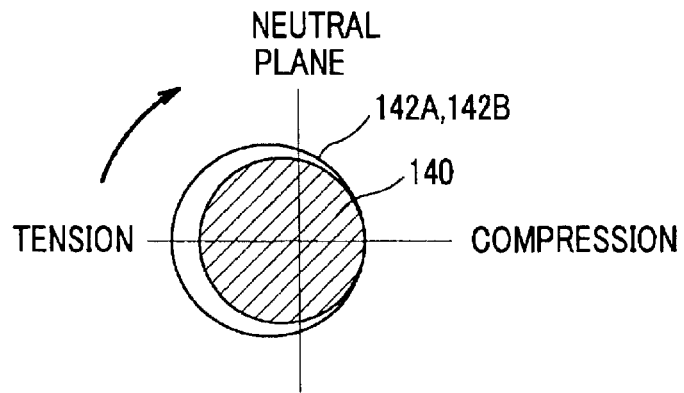
FIGS. 11A, 11B and 11C are schematic diagrams illustrating the eccentricity of a magnetostrictive membrane or dispersion in its thickness.
Figure 11B:
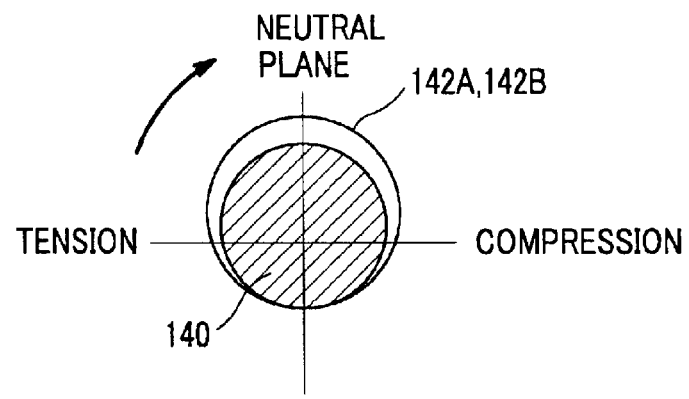
Figure 11C:
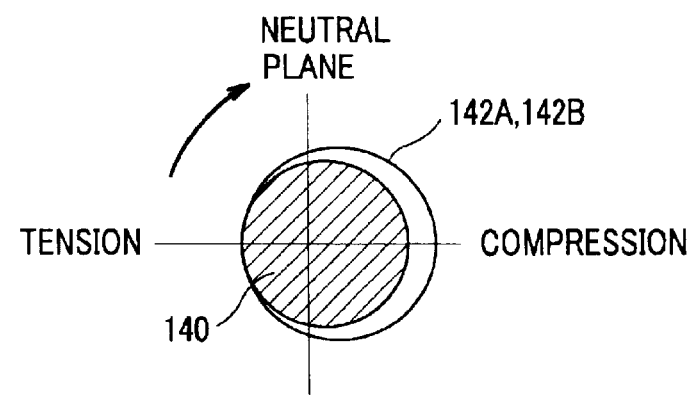
Figure 12:
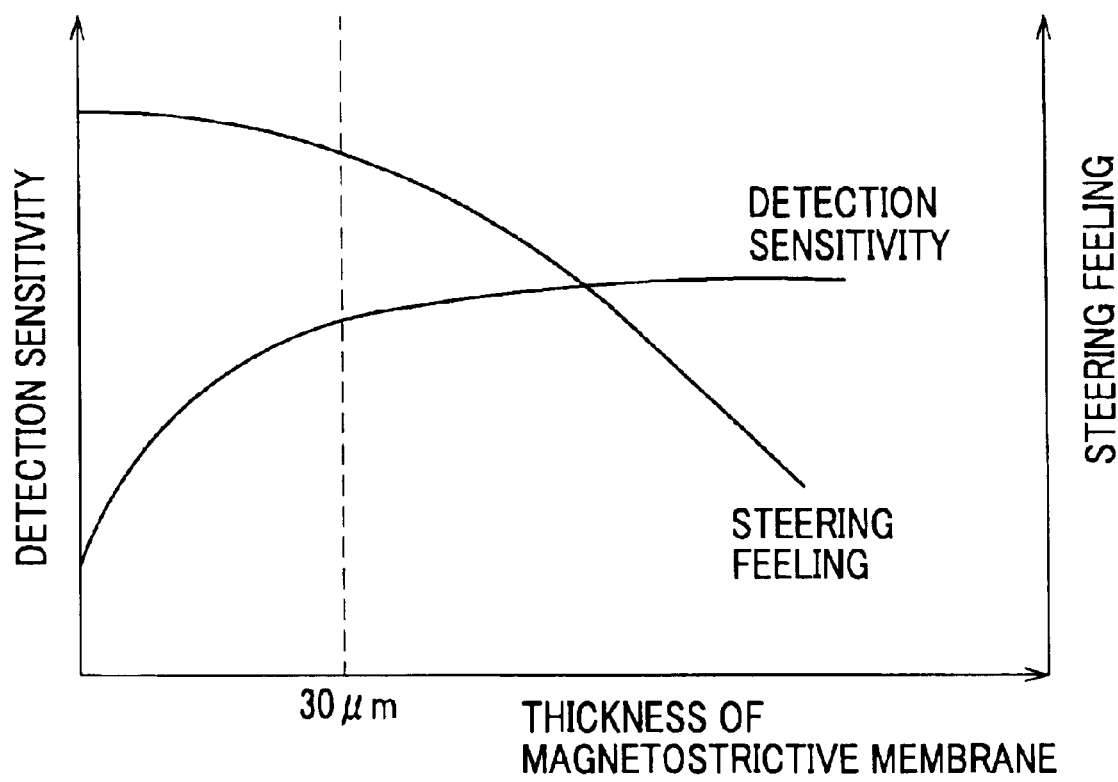
FIG. 12 is a graph showing the relationship between the thickness of a magnetostrictive membrane and the detection sensitivity of a rotational torque detection mechanism as well as that between the thickness and the steering feeling of a driver.

A fifth embodiment of the present invention is described referring to FIGS. 10, 11A, 11B, 11C and 12. FIG. 10 is a sectional view showing a rotational torque detection mechanism of the fifth embodiment taken along line 10—10 in FIG. 4. FIGS. 11A, 11B and 11C are sectional views of a rotational shaft showing eccentricity or dispersion in the thickness of a magnetostrictive membrane. In FIGS. 11A, 11B and 11C the eccentricity is exaggerated for convenience sake. FIG. 12 is a graph showing the relationship between the thickness of a magnetostrictive membrane and the detection sensitivity of a rotational torque detection mechanism as well as that between the thickness and the steering feeling of a driver.

As shown in FIG. 10, a rotational torque detection mechanism 290 has a bearing 291 which supports an upper end portion 140b of a rotational shaft 140. The thicknesses of magnetostrictive membranes 142A and 142B are adapted to be less than or equal to 30 micron meters. This makes a difference between the rotational torque detection mechanisms 290 and 210 according to the first embodiment shown in FIG. 5. The same symbol is used for an item which is the same as that of the first embodiment and description in detail would not be repeated for it.

Generally speaking, the thicknesses of magnetostrictive membranes 142A and 142B have some dispersion relative to the angular position of rotational shaft 140, as shown in FIGS. 11A, 11B and 11C. When the rotational shaft 140 rotates while bending moment is acting perpendicularly on it, distortion associated with compression and tension relative to a neutral plane occurs in the magnetostrictive membranes 142A and 142B. FIGS. 11A, 11B and 11C sequentially illustrate the clockwise rotation of rotational shaft 140. In this connection, the neutral plane is meant to represent a plane free from compressive and tensile force.

A magnetostrictive membrane generally varies its magnetic permeability according to either compressive or tensile distortion. For example, assume a case where external force acting perpendicularly on the rotational shaft 140 induces compressive distortion in it and the rotational shaft 140 rotates in the sequence of FIG. 11A through FIG. 11C. The magnetic permeability of magnetostrictive membranes 142A and 142B takes the highest value when its thickness becomes the largest as shown in FIG. 11C. On the other hand it takes the lowest value when its thickness becomes the smallest as shown in FIG. 11A. In this way, the magnetic permeability varies according to the angular position of rotational shaft 140.

If each thickness of the magnetostrictive membranes 142A and 142B is adapted to be less than or equal to 30 micron meters, an error in torque detection attributed to the thickness variation according to the angular position can be sufficiently restricted. The reason for this is that the variation of magnetic permeability resulting from the eccentricity of the rotational shaft 140 according to its angular position is not dominant because the magnetostrictive membranes 142A and 142B are adapted to be as thin as less than or equal to 30 micron meters. Therefore, an electric power steering apparatus 200, into which the rotational torque detection mechanism 290 is installed, can provide comfortable steering feeling for a driver.

f. Sixth Embodiment

A rotational torque detection mechanism of a sixth embodiment is basically the same as that of the first embodiment shown in FIG. 5. The same symbol is used for an item which is the same as that of the first embodiment and description in detail would not be repeated for it.

Figure 13:
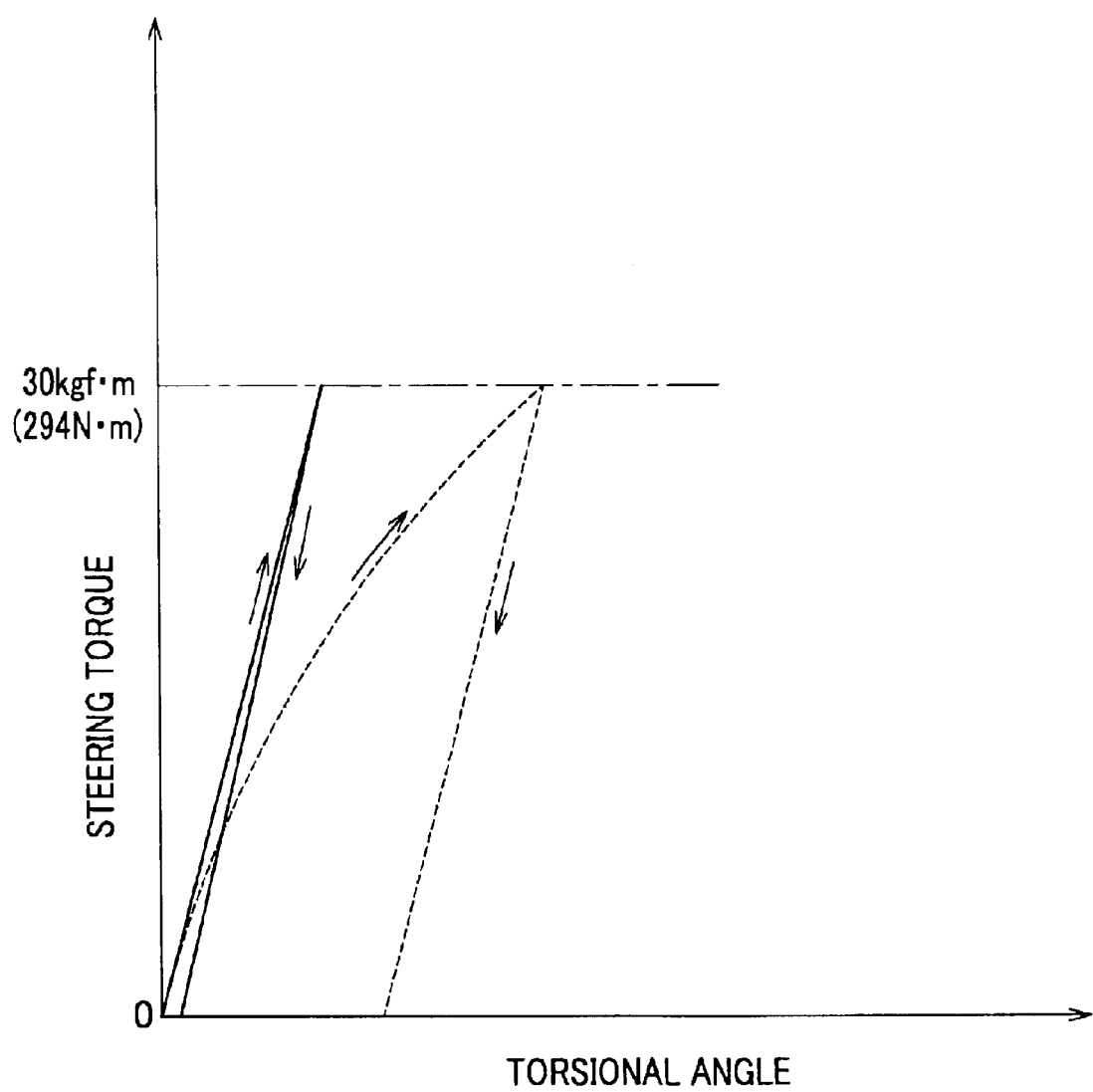
FIG. 13 is a diagram of characteristic curve showing the relationship between torsional angle and steering torque
Figure 14:
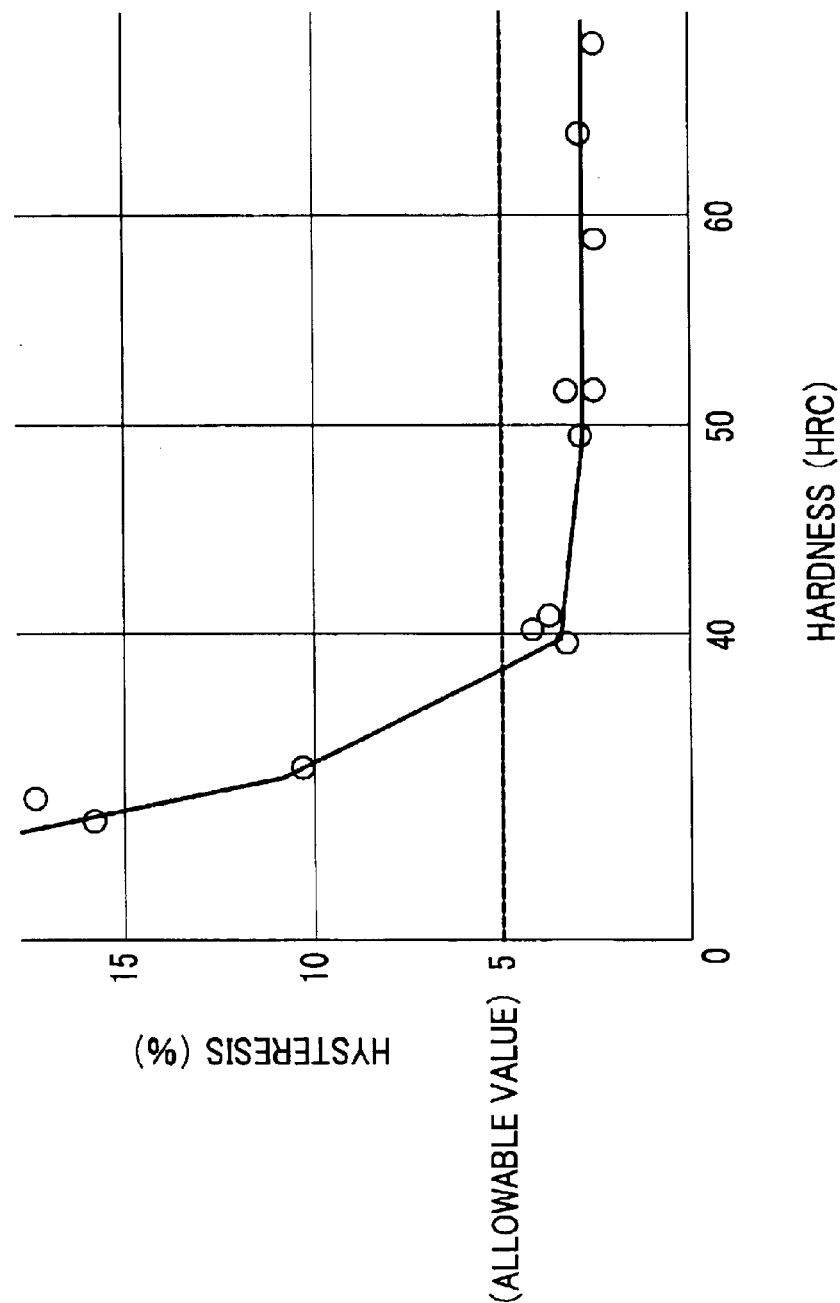
FIG. 14 is a diagram of characteristic curve showing the relationship between hardness of a shaft and its hysteresis.

FIG. 13 is a schematic diagram of characteristic curve showing the relationship between torsional angle and steering torque. FIG. 14 is another diagram of characteristic curve showing the relationship between hardness of a shaft and its hysteresis when torque as much as 30 Kgf-m is applied to it.

A rotational shaft 140 is made of chrome molybdenum steel such as SCM 822. The rotational shaft 140 is given Rockwell hardness of 40–65, which undergoes hardening process and subsequent attachment of magnetostrictive membranes 142A and 142B using PVD method such as spattering or ion plating, plating method or plasma spraying method. It may be possible to select an alternative process of superficial charring with carburization on the surface of chrome molybdenum steel. The reason for setting the upper limit of HRC65 is that if the hardness exceeds this number, the rotational shaft 140 is susceptible to breakage caused by its brittleness. On the other hand, the lower limit of HRC40 is determined so that the deformation of rotational shaft 140 can occur within the elastic range even if excessive rotational torque is applied to it.

As shown in FIG. 4, when a steering wheel 110 is turned clockwise or counterclockwise to its end, an end of a rack shaft 160 hits an end of a lower housing 250B. This may possibly create large impulsive torque which is transmitted to the rotational shaft 140, causing its plastic deformation. If the plastic deformation develops to some extent, magnetostrictive membranes 142A and 142B start separating from the surface of the rotational shaft 140, which may create hysteresis for the output signal of rotational torque detection mechanism 210.

It has been discovered that the rotational shaft 140 having Rockwell hardness of HRC40–65 can restricts the plastic deformation to remarkably small amount even if excessive steering torque as much as 30 Kgf-m is applied to it, as compared with a conventional shaft whose characteristic is shown by a broken line in FIG. 13. This prevents the separation of magnetostrictive membranes 142A and 142B from the rotational shaft 140.

As shown in FIG. 14, if Rockwell hardness of HRC40–65 is selected, the hysteresis of the rotational shaft 140 attributed to its plastic deformation can be limited to less than or equal to an allowable value of 5% even if the rotational torque as much as 30 Kgf-m is applied to it.

In this way, it is possible to provide good accuracy for the rotational torque detection mechanism 210, resulting in better steering feeling for a driver.

In this connection, bearings 211 and 212 and a pinion gear 141 can undergo heat treatment for acquiring Rockwell hardness, for example HRC58, in one step along with the rotational shaft 140 because the magnetostrictive membranes 142A and 142B are attached to the rotational shaft 140 after its heat treatment. This results in reduction of time period associated with manufacturing of the rotational torque detection mechanism 210.

Furthermore, the rotational torque detection mechanism 210 of the sixth embodiment, in which the magnetostrictive membranes 142A and 142B are attached to the rotational shaft 140, can have detection sensitivity 10 to 100 times as high as that of a conventional mechanism in which its whole rotational shaft is made of a magnetostrictive material.

g. Seventh Embodiment

Figure 15:
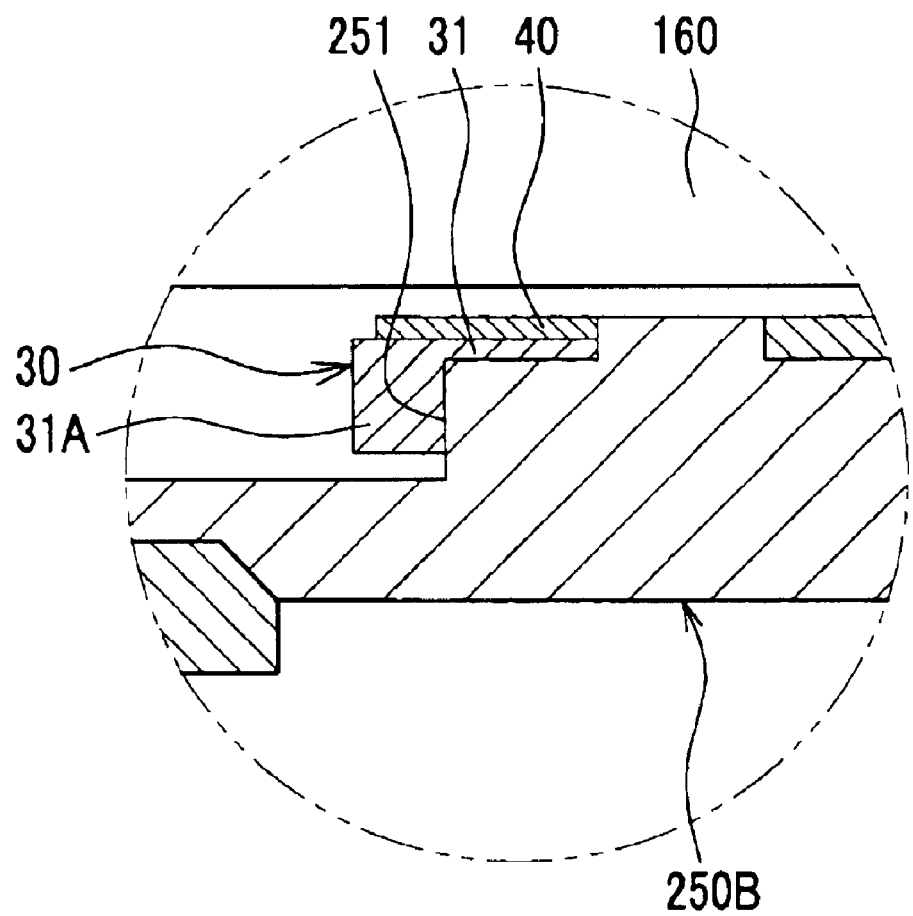
FIG. 15 is an enlarged sectional view showing the area E in FIG. 4.

FIG. 15 is an enlarged sectional view showing the area E in FIG. 4. An electric power steering apparatus according to a seventh embodiment employs a shock absorber which relaxes impact force acting on a rotational torque detection mechanism. The same symbol is used for an item which is the same as that of the first embodiment and description in detail would not be repeated for it.

As shown in FIG. 15, a shock absorber 30, which is made of cylindrical elastic material such as rubber, includes an absorber element 31 attached to an end portion 251 of a lower housing 250B and a steel element 40 attached to the absorber element 31. The absorber element 31 has a brim portion 31A extending in the axial direction.

When a steering wheel 110 is turned clockwise or counterclockwise to its end, one of two ends of rack shaft 160 hits the brim portion 31A, which is able to absorb impulsive force. In this way, it is possible to avoid creating a large increase in steering torque in such a case as a result of damping effect of the shock absorber 30, thereby preventing magnetostrictive membranes 142A and 142B from separating from a rotational shaft 140. This results in improvement of hysteresis and durability of a rotational torque detection mechanism 210, thereby providing better steering feeling.

h. Eighth Embodiment

A rotational torque detection mechanism of an eighth embodiment is basically the same as that of the first embodiment shown in FIG. 5.

Figure 16A:
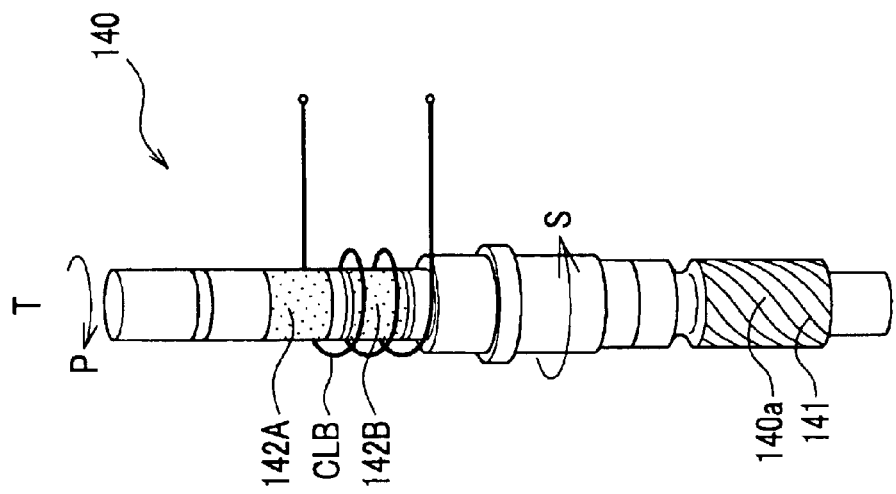
FIG. 16A is a perspective view showing a rotational shaft with magnetostrictive membranes to which counterclockwise torque is applied.
Figure 16B:
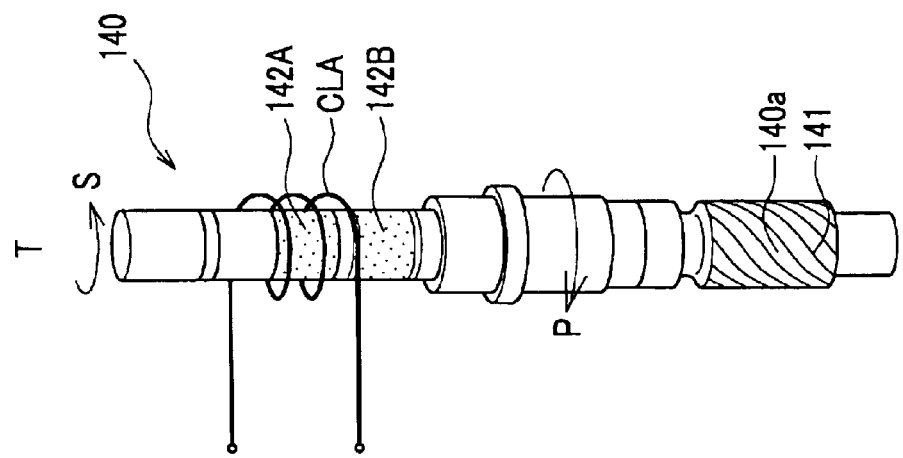
FIG. 16B is a similar view for clockwise torque.

FIG. 16A is a perspective view showing a rotational shaft with magnetostrictive membranes to which counterclockwise torque is applied. FIG. 16B is a similar view for clockwise torque. In a rotational torque detection mechanism 210 of the eighth embodiment, anisotropy is imposed on magnetostrictive membranes 142A and 142B, which are attached to a rotational shaft 140 after its heat treatment for Rockwell hardness of HRC40–65.

As shown in FIGS. 16A and 16B, the rotational torque detection mechanism 210 includes the rotational shaft 140, which has a pinion gear 141 at its lower end portion 140a, and the magnetostrictive membranes 142A and 142B which are attached vertically spaced from each other to the circumferential surface of the rotational shaft 140.

A method for manufacturing the rotational torque detection mechanism 210 is described below.

The magnetostrictive membranes 142A and 142B are attached to the circumferential surface of the rotational shaft 140 after it undergoes heat treatment for Rockwell hardness of HRC40–65. The rotational shaft 140 is twisted in the directions P and S as shown in FIG. 16A so that counterclockwise pre-load torque T, 10 Kgf-m for example, is applied to the magnetostrictive membrane 142A. The magnetostrictive membrane 142A is heated up to about 300 deg. C. for a couple of seconds by its high frequency vibration induced by a coil CLA. Subsequently, the rotational shaft 140 is relieved of the pre-load torque T after cooling down of the magnetostrictive membrane 142A. In these steps anisotropy is imposed on the magnetostrictive membrane 142A.

As shown in FIG. 16B, anisotropy in the reverse direction is imposed on the magnetostrictive membrane 142B.

The rotational shaft 140 of the eighth embodiment, which undergoes heat treatment to acquire Rockwell hardness of HRC40–65 in advance, does not experience plastic deformation while the magnetostrictive membranes 142A and 142B are undergoing the anisotropy process with the pre-load torque T. This results in a process which is able to stably impose anisotropy. Also the rotational shaft 140 free from plastic deformation provides higher linearity for the rotational torque detection mechanism 210. The reason for this is that the process for imposing anisotropy with the pre-load torque T within the elastic range of rotational shaft 140 can preclude nonlinearity in output signals of the magnetostrictive membranes 142A and 142B in the detection range, as shown in FIG. 17.

While the invention has been described in detail and with reference to specific embodiments thereof, it will be apparent to one skilled in the art that various changes and modifications can be made therein without departing from the spirit and scope thereof.

For example, a rotational torque detection mechanism according to the present invention has been described for its application to an electric power steering apparatus of a pinion assist type, in which assist torque is exerted on a rotational shaft. It is not limited to this type but the mechanism can be used for an electric power steering apparatus of a rack assist type in which assist torque is applied to a rack shaft.

Although a shock absorber of the seventh embodiment includes an absorber element and a steel element, it may be possible to select alternatively another type of shock absorber such as a spring.

In addition, the shock absorber, which is attached to a lower housing, may be alternatively attached to a rack shaft or both lower housing and the rack shaft.

What is claimed is:

1. A rotational torque detection mechanism comprising:

a rotational shaft rotatably supported whose first end portion reaches outside the mechanism;

a magnetostrictive membrane disposed on a surface of the rotational shaft and the membrane varying magnetic permeability thereof according to an amount and direction of rotational torque acting on the rotational shaft;

an excitation circuit which is disposed to confront the rotational shaft so as to excite the magnetostrictive membrane; and a detection circuit which is disposed to confront the rotational shaft so as to electrically detect a change of the magnetic permeability of the magnetostrictive membrane, wherein the first end portion is a free end and a second end portion of the rotational shaft is rotatably supported.

2. A rotational torque detection mechanism according to claim 1 further comprising an elastic member which is slidably disposed around the first end portion.

3. A rotational torque detection mechanism according to claim 1 further comprising a bearing which is disposed around the first end portion with a predetermined gap distance.

4. A rotational torque detection mechanism according to claim 1 wherein a thickness of the magnetostrictive membrane is adapted to be less than or equal to 30 micron meters.

5. A rotational torque detection mechanism according to claim 1 wherein Rockwell hardness of the rotational shaft is adapted to fall in a range between equal to or greater than 40 and less than or equal to 65.

6. An electric power steering apparatus in which the rotational torque detection mechanism according to claim 1 is installed, wherein the apparatus provides assist torque according to an output signal of the mechanism.

7. An electric power steering apparatus according to claim 6 further comprising a shock absorber which relaxes impact force acting on the rotational torque detection mechanism.

* * * * *